(12) United States Patent
Handforth et al.

(10) Patent No.: US 6,885,745 B1
(45) Date of Patent: Apr. 26, 2005

(54) VOLTAGE AND PROTECTION ARRANGEMENT FOR A TELEPHONE SUBSCRIBER LINE INTERFACE CIRCUIT

(75) Inventors: Martin R. Handforth, Kanata (CA); Gerard J. Hupe, Nepean (CA); Donald S. McGinn, Ashton (CA); Rolf G. Meier, Carp (CA); Canute Planthara, Ottawa (CA); Raymond K. Wong, Kanata (CA)

(73) Assignee: Nortel Networks, Ltd., St. Laurent (CA)

( * ) Notice: Subject to any disclaimer, the term of this patent is extended or adjusted under 35 U.S.C. 154(b) by 0 days.

(21) Appl. No.: 09/213,271

(22) Filed: Dec. 17, 1998

(51) Int. Cl.$^7$ ................................................ H04M 3/12
(52) U.S. Cl. .................... 379/412; 379/399.01; 379/413
(58) Field of Search ................................ 379/412, 413, 379/399.01, 2; 361/58, 79, 102, 91.1

(56) References Cited

U.S. PATENT DOCUMENTS

| | | | |
|---|---|---|---|
| 3,544,720 A | 12/1970 | Corderman | |
| 3,590,325 A | * 6/1971 | McMillen et al. | 361/92 |
| 4,709,296 A | * 11/1987 | Hung et al. | 361/102 |
| 4,947,427 A | 8/1990 | Rosch et al. | 379/412 |
| 5,163,090 A | 11/1992 | Pawlowski et al. | 379/399 |
| 5,333,196 A | 7/1994 | Jakab | 379/413 |
| 5,388,022 A | 2/1995 | Ahuja | |
| 5,390,231 A | * 2/1995 | Hung et al. | 379/2 |
| 5,490,215 A | 2/1996 | Pelegris | |
| 5,539,820 A | 7/1996 | Pistilli | |
| 6,061,445 A | 5/2000 | Rahamim et al. | |
| 6,288,883 B1 | * 9/2001 | Chen | 361/58 |

FOREIGN PATENT DOCUMENTS

| | | |
|---|---|---|
| DE | 43 26 596 A1 | 2/1995 |
| DE | 195 08 226 C | 8/1996 |
| EP | 0 185 213 A2 | 6/1986 |
| EP | 0 209 973 A1 | 1/1987 |
| EP | 0 291 169 A1 | 11/1988 |
| EP | 0 295 683 A2 | 12/1988 |
| WO | WO 01/08389 A1 | 2/2001 |

OTHER PUBLICATIONS

Thyristors and their Applications, P. Atkinson, May 1974, pp. 5 and 102–107.
SGS–Thomson Microelectronics Application Note, Transil/Trisil Comparison (4 pages).
SGS–Thomson Microelectronics Application Note, Trisil Crowbar Type Protection Diode (7 pages).
Nu Horizons Electronics Corp., SGS–Thomson—Gold Standards ADSTM and Discretes.

* cited by examiner

Primary Examiner—Xu Mei
Assistant Examiner—Walter F. Briney, III
(74) Attorney, Agent, or Firm—John C. Gorecki

(57) ABSTRACT

A protection arrangement for a telephone subscriber line interface circuit is disclosed. The arrangement is particularly useful for protecting an electronic telephone set from over-voltage and over-current fault conditions. The arrangement provides a FET that operates in saturation mode to connect an office battery to the subscriber line under normal operation. The FET also provides isolation capabilities for protecting the line circuit from an over-current condition on the subscriber line. Over-voltage protection is provided by way of an isolation relay between the line circuit and the subscriber line. Both the FET and isolation relay are operated by a controller that uses timers in the methods of over-voltage and over-current protection that it performs. A further capability of the arrangement is that it resets itself after the fault condition has ended. This feature is particularly useful in the case of fault conditions of short duration.

20 Claims, 6 Drawing Sheets

VOLTAGE AND PROTECTION ARRANGEMENT FOR A TELEPHONE SUBSCRIBER LINE INTERFACE CIRCUIT

This invention relates to voltage and current protection arrangements and more particularly to protection arrangements for telephone subscriber line interface circuits, hereinafter referred to as a line circuits.

BACKGROUND OF THE INVENTION

Protecting a line circuit from excessive voltages and currents that can occur on the line to which it is connected is a well-known requirement. These excessive voltages and currents may be the result of relatively rare occurrences in the service lifetime of the line circuit, such as lightning strikes, or more common occurrences, such as short circuits to other lines or ground. Size, cost, and heat dissipation of the protection arrangement are important design considerations since a protection arrangement is needed for each subscriber line.

A protection arrangement for a line circuit is disclosed by Rosch et al. U.S. Pat. No. 4,947,427 issued Aug. 7, 1990 and entitled "Protection Arrangement for a Telephone Subscriber Line Interface Circuit". While the protection arrangement appears to be suitable for over-current conditions of long duration, it might not be a desirable solution for ones of the short duration. Momentary short circuits, between the tip and ring lines of the subscriber loop, or between the ring line and ground, are often long enough in duration to cause an over-current condition. The protection arrangement of Rosch could be used to protect the line circuit during these short duration events. However, under such use, and if the events happened often, the isolation relay of Rosch could prematurely wear-out due to frequent opening and closing of the relay contacts.

A fault condition of short duration that interrupts the subscriber's telephone service, is likely to cause a loss of service that is much longer than the actual duration of the fault condition, especially if the line circuit must be manually returned to a normal operating condition after the fault condition has ended.

A further consideration is designing a protection arrangement for a line circuit is that there are different types of phone sets each having different requirements. For example, a plain old telephone set (POTS) telephone typically requires 18 mA to 90 mA of DC loop current, which is provided by a 52 volt battery in the central office. The line circuit typically has a 200 ohm feed resistor in each of the tip and the ring lines of the subscriber loop. The length of the subscriber loop, that is, the distance between the telephone and the central office, can result in a typical loop resistance (including the telephone set) in the range of 100 to 2000 ohms. For short loops having a resistance of less than 600 ohms, current limiting during normal operation is required to prevent the loop current from exceeding a maximum current limit. This maximum current limit can range from 30 to 50 mA, for example, depending on the telephone system. Excessive current beyond the maximum current limit could damage the telephone set, the feed resistors of the line circuit, or other components in the telephone system.

A current limiting arrangement is disclosed by Jakab in U.S. Pat. No. 5,333,196 issued Jul. 26, 1994 and entitled "Current Limiting Battery Feed Arrangement". Although the arrangement appears to provide the desired current limiting result, the dollar cost, circuit board space and heat-dissipation of the components in the arrangement might outweigh the benefits derived from them in some applications. Additionally, some types of telephone sets have certain characteristics, which obviate the need for the type of current protection provided by the arrangement disclosed by Jakab. For example, in the case of a type of telephone set known as an electronic telephone set, the set acts as a current sink which controls the amount of current flowing in the subscriber loop. Thus, the need for current limiting in short loops having low loop resistance is eliminated under normal operating conditions. Current limiting under fault conditions, such as when the tip and ring lines are shorted together, or when the ring line is shorted to ground, is still a requirement for this type of set.

In view of the above, it appears that it would be desirable to have a voltage and current protection arrangement for a line circuit that takes advantage of the current limiting capability of electronic telephone sets under normal operating conditions.

SUMMARY OF THE INVENTION

An object of the present invention is to provide an improved voltage and current protection arrangement for a line circuit that has been designed to support an electronic telephone set.

The improved voltage and current protection arrangement is responsive to fault conditions of short duration. To this end, the voltage and current protection arrangement is capable of automatically resetting itself when the line voltage and current has returned to normal operating conditions.

Conveniently, isolation circuitry, which is used to selectively couple a power supply to the line circuit, uses a field effect transistor (FET). The FET is operated in saturation mode when coupling is required and is turned off when decoupling is required. The interface circuitry required to operate the FET in this mode uses less components than if the FET were operated in the linear mode, thereby reducing the component count and hence the cost of the protection arrangement. This use of the FET in saturation mode takes advantage of the fact that an electronic telephone set does not require current limiting to be provided by the line circuit under normal operation.

In this specification, the term "normal operating conditions" means the circumstances under which the line circuit, telephone set, and subscriber line are operated, wherein the circumstances are characterized by the absence of any fault condition, such as an over-current or over-voltage condition that could affect the telephone service being provided to the telephone service subscriber. Similarly, the term "normal operation" means the mode in which the line circuit, telephone set, and subscriber line are operated, under normal operating conditions, such that telephone service is provided to the telephone service subscriber.

In accordance with an aspect of the present invention there is provided a protection arrangement for a line circuit, comprising: current sensing circuitry for sensing current flowing through the telephone subscriber line; isolation circuitry for selectively coupling a power supply to the line circuit; and a controller for operating the isolation circuitry to decouple the power supply from the line circuit in response to a current sensed by the current sensing circuitry exceeding a current threshold, and to re-couple the power supply to the line circuit responsive to a predetermined time interval having passed.

In accordance with another aspect of the present invention there is provided a method of protecting a line circuit connected to a power supply and to a telephone subscriber line from an over-current condition, the over-current condition being defined as when current flowing through the telephone subscriber line exceeds a predetermined current threshold value, comprising the steps of: checking for a presence of the over-current condition; starting, responsive to the over-current condition being present, a timer of predetermined duration; disconnecting, responsive to the timer having expired, the line circuit from the power supply; waiting a predetermined amount of time; and reconnecting the line circuit to the power supply.

An advantage of using this method of over-current protection is that it is responsive to the duration of the over-current condition. That is, after the over-current condition has ended, the line circuit will remain disconnected from the power supply for the duration of the predetermined interval of time, at most, before it is reconnected, thereby allowing the line circuit to return to normal operation, if possible.

In accordance with yet another aspect of the present invention there is provided a method of protecting a line circuit connected to a telephone subscriber line from an over-voltage condition, the over-voltage condition being defined as when voltage on the telephone subscriber line exceeds a predetermined voltage threshold value, comprising the steps of: checking for a presence of the over-voltage condition; starting, responsive to the over-voltage condition being present, a first timer of predetermined duration; disconnecting, responsive to the timer having expired and to the over-voltage condition being present, the line circuit from the telephone subscriber line; waiting a predetermined amount of time; and reconnecting the line circuit to the telephone subscriber line.

An advantage of using this method of over-voltage protection is that it is responsive to the duration of the over-voltage condition. That is, after the over-voltage condition has ended, the line circuit will remain disconnected from the telephone subscriber line for the duration of the predetermined interval of time, at most, before it is reconnected, thereby allowing the line circuit to return to normal operation, if possible.

BRIEF DESCRIPTION OF THE DRAWINGS

The present invention will be further understood from the following description with reference to the drawings in which.

In the drawings similar features are shown with like reference numerals.

DETAILED DESCRIPTION

Figure 1:
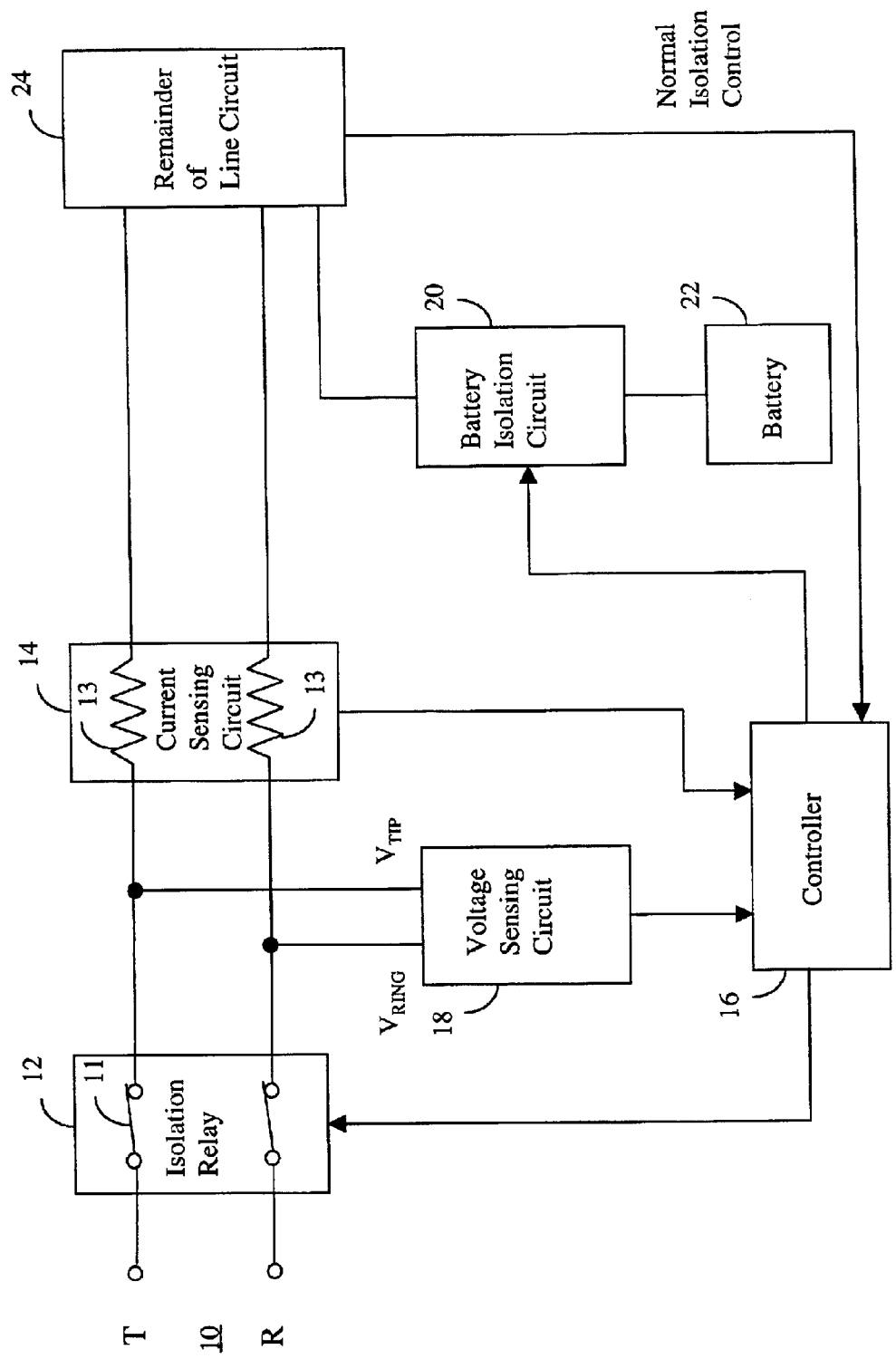
FIG. 1 is a functional block diagram of a line circuit including a protection arrangement in accordance with an embodiment of the invention.

Referring to FIG. 1, a line circuit and protection arrangement is illustrated coupled to a two-wire telephone subscriber line 10 comprising tip and ring wires on sides T and R of the line 10, respectively. An isolation relay 12 is coupled in series with the tip and ring wires and provides a normally closed double pole switch 11 in series with each of the T and R sides of the line 10. A battery feed resistor 13 is connected in series between the isolation relay 12 and the remainder of the line circuit on each of the T and R sides of the line 10. A current sensing circuit 14 is coupled to the battery feed resistors 13. The isolation relay 12 is for disconnecting the line circuit from the subscriber line 10. This may be done for protecting the line circuit from an over-voltage condition that exists on the line 10, or for testing purposes. In addition, in accordance with this invention the isolation relay 12 is controlled by a controller 16 in dependence upon tip and ring voltages, $V_{TIP}$ and $V_{RING}$, at the T and R sides of the line 10, respectively. The tip and ring voltages, $V_{TTP}$ and $V_{RING}$, are sensed by a voltage sensing circuit 18 connected to the T and R sides of the line 10 between the isolation relay 12 and the battery feed resistors 13. A battery 22 provides power to the subscriber line 10 through a battery isolation circuit 20 and the remainder of the line circuit 24. The controller 16 has inputs connected to the voltage sensing circuit 18, the current sensing circuit 14, and an input connected to the remainder of lines circuit 24 for normal isolation control used for testing purposes. An output of the controller 16 is connected to the isolation relay 12 for controlling opening and closing of the switch 11 of the isolation relay 12. Another output of controller 16 is connected to the battery isolation circuit 20 for controlling connection of the battery 22 to the R side of the subscriber line 10.

Figure 2:
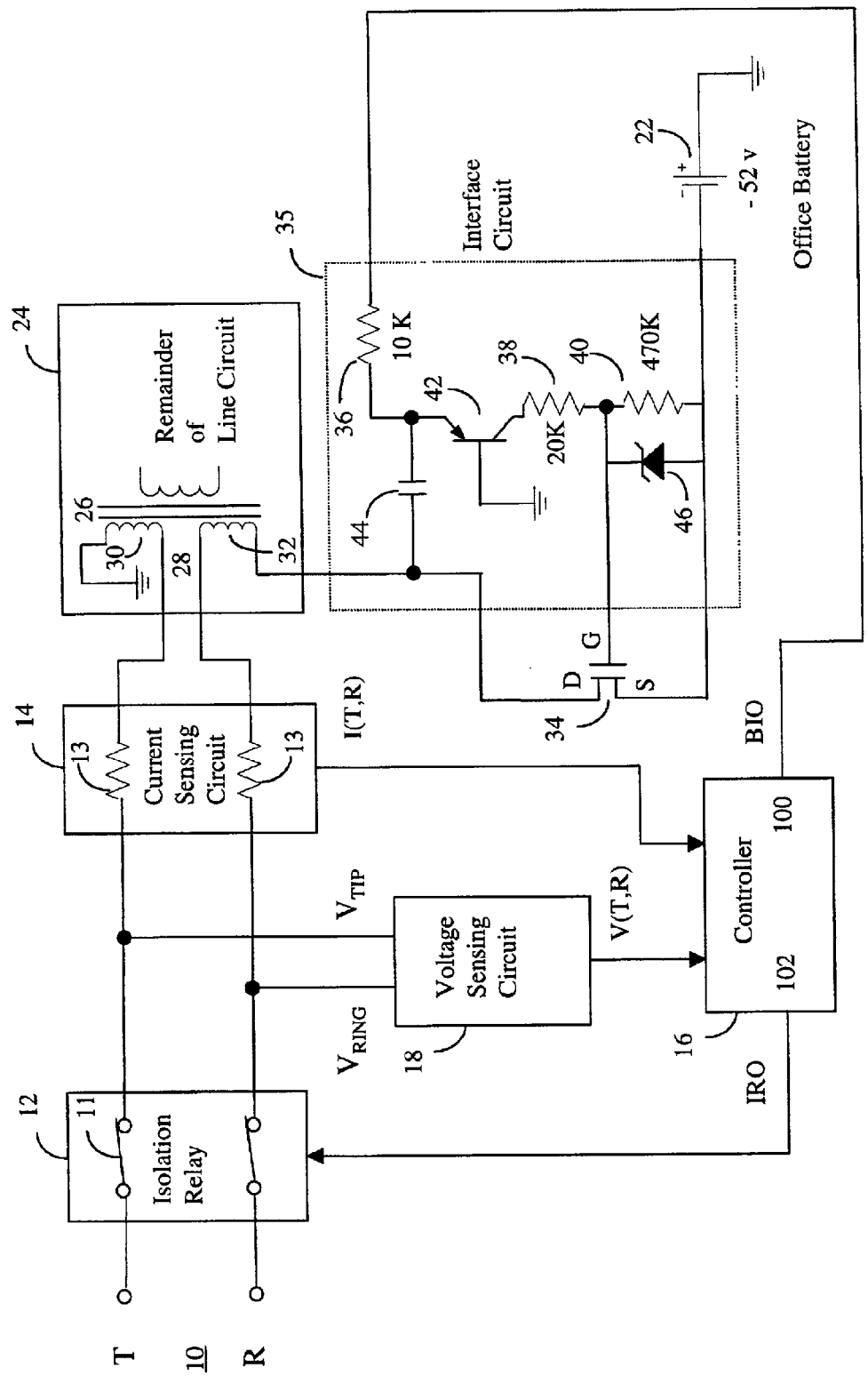
FIG. 2 is a circuit diagram schematically illustrating the battery isolation block of FIG. 1 in greater detail.

Referring to FIG. 2, in which the battery isolation circuit 20 and some aspects of the remainder of line circuit 24 are shown in greater detail, the structure and operation of the battery isolation circuit will be described. The battery isolation circuit 20 includes an N-channel enhancement FET 34 and an interface circuit 35 that is indicated by a dashed box. The remainder of line circuit 24 includes a transformer 26 having a split secondary winding 28. Opposite halves 30 and 32 of the secondary winding are connected in series with the battery feed resistors 13 on the T and R sides of the line 10, respectively. The winding 30 is connected in series with the battery feed resistor 13 on the T side of the line 10 and ground. The winding 32 is connected in series with the battery feed resistor 13 on the R side of the line 10 and the drain of the FET 34. The source of the FET 34 is connected to the negative terminal of the battery 22, typically of 52 volts. The positive terminal of the battery is connected to battery return ground.

In operation, current flowing through the subscriber line 10 must flow through the FET 34, which has a low resistance between its source and drain when it is turned on. When the FET 34 is turned off, it has a very high resistance between its source and drain, thereby inhibiting current flow in the line 10. The interface circuit 35 is connected across the source and drain of the FET 34, and has an input connected to a battery isolation output 100 of the controller and an output connected to the gate of the FET 34. The interface circuit 35 is responsive to the battery isolation output 100. When the battery isolation output 100 outputs current, the interface circuit 35 turns the FET 34 on such that it is operating in saturation mode, thereby connecting the battery 22 to the remainder of the line circuit 24, and hence the line 10. When there is no current flowing from the battery isolation output 100, the interface circuit 35 turns the FET 34 off to decouple the battery 22 from the remainder of the line circuit 24, and hence the line 10.

The interface circuit 35 includes resistors 36, 38 and 40, and a pnp transistor 42 that has its base connected to ground. The battery isolation output 100 is connected to the resistor 36, which is connected in series with the emitter of the transistor 42. The resistor 38 is connected to the collector of the transistor 42 and in series with the resistor 40 that is connected at its other terminal to the negative terminal of the battery 22. The transistor 42 and resistors 36, 38 and 40 provide a level shifting function such that, when the battery isolation output 100 provides current, the voltage across the resistor 40 will turn the FET 34 on in saturation mode. When the battery output 100 does not provide current there is no gate voltage applied to the FET 34 and hence the FET 34 is turned off.

The interface circuit 35 further includes a zener diode 46 with its cathode connected to the gate of the FET 34 and its anode connected to the negative terminal of the battery 22. This zener diode 46 limits the gate-source voltage applied to the FET 34 to avoid exceeding its maximum gate-source voltage rating. The breakdown voltage $V_B$ of the zener diode 46 is 18 volts.

In normal operation, the battery isolation output 100 sources a current of 16 microamps into resistor 36, and consequently through the pnp transistor 42 and resistors 38 and 40. The voltage drops across the resistor 40 is 7.52 volts (16×10E-6×470 Kohms). This voltage is applied across the gate and source terminals of the FET 34, and is sufficient to operate the FET 34 in saturation mode. The threshold voltage $V_T$ of the FET 34 is in the order of 3 to 5 volts.

Figure 3:
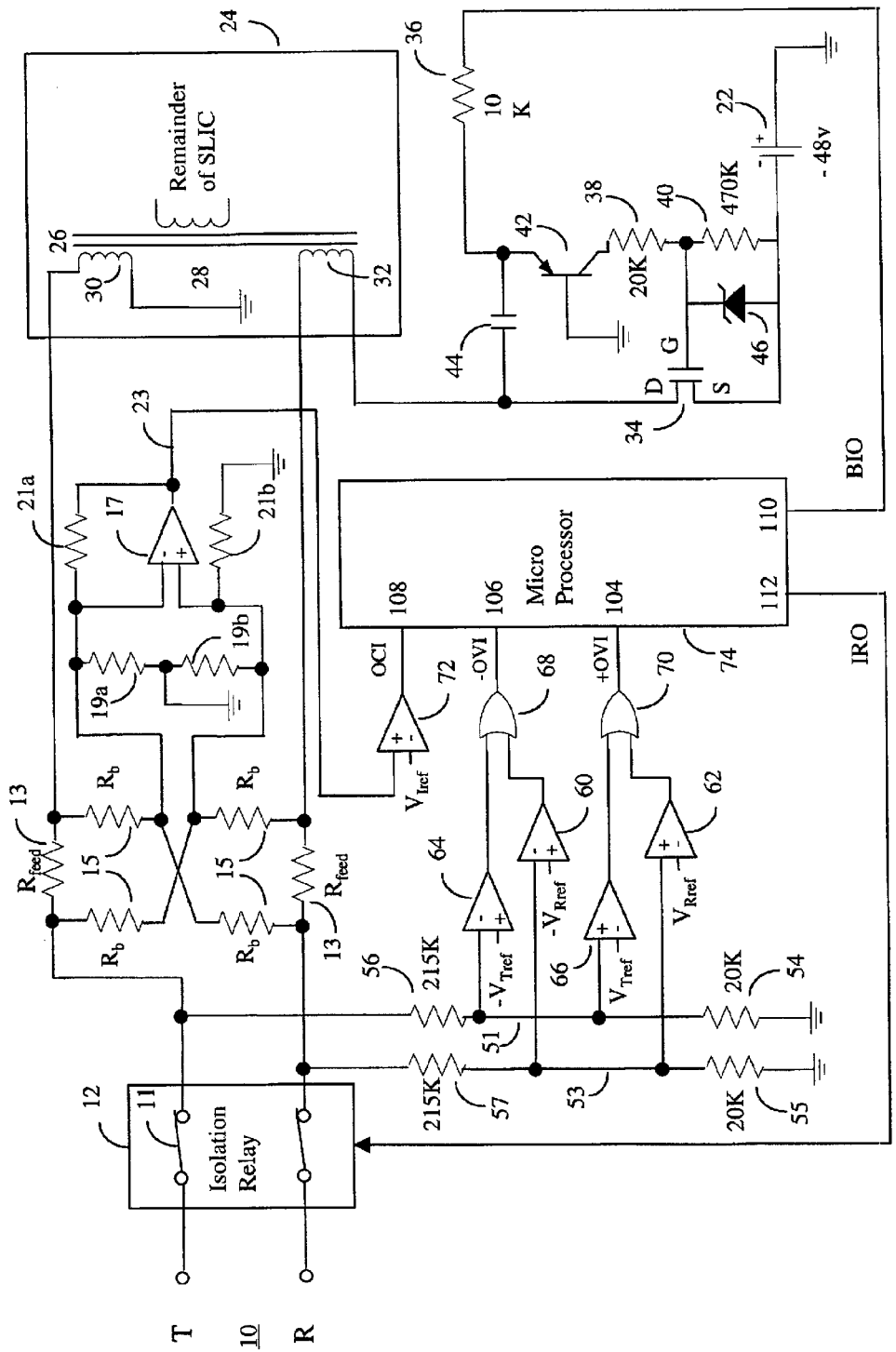
FIG. 3 is a circuit diagram schematically illustrating the current and voltage sensing circuits, and the controller of FIG. 1 in greater detail.

Referring to FIG. 3, in which the structure of the current and voltage sensing circuits and the controller block is shown in greater detail, the structure and operation of these blocks will now be described. The current sensing circuit 14 includes cross-coupled potential dividers formed by resistors 15 coupled to closely matched feed resistors 13. Operational amplifier 17, resistors 19a and 19b, and resistors 21a and 21b form a differential amplifier circuit, which has an output line 23 having a voltage that is representative of the current through the feed resistors 13. The resistors 19a and 19b have a common node connected to ground and each have their other node connected to the midpoint of a respective voltage divider formed by the resistors 15. The resistors 21a is connected across the output of the operational amplifier 17 and its inverting input. The resistor 21b is connected across the non-inverting input of the operational amplifier 17 and ground. Typical values of the resistors 13, 15, 19, and 21 are 165 ohms, 200 kilohms, 15 kilohms, and 13.33 kilohms, respectively.

The voltage sensing circuit 18 includes a voltage divider connected on the line circuit side of the relay 12, between the T side of line 10 and ground, the divider being formed by resistors 54 and 56, and having a node 51 at their connection to each other. Another voltage divider is also included, connected between the R side of the line 10 and ground, the divider being formed by resistors 55 and 57, and having a node 53 at their connection to each other. The nodes 51 and 53 are input to the controller 16 and the voltages on them are representative of the tip and ring voltages $V_{TIP}$ and $V_{RING}$, on the T and R sides of the line 10.

The controller 16 includes comparators 60 and 64, the outputs of which are connected to the inputs of an OR gate 68, and comparators 62 and 66, whose outputs are connected to the inputs of another OR gate 70. The outputs of the OR gates 68 and 70 are connected to the inputs 106 and 104, respectively, of a microprocessor 74. The microprocessor 74 includes a processing element, a system clock, registers and a memory for storing program instructions, variables and data used during execution of the program instructions. A logic true level, +5 volts, on input 104 indicates the presence of a positive over-voltage condition (+OVI). Similarly, a logic true level on input 106 indicates the presence of a negative over-voltage condition (−OVI). The comparators 60 and 64 have their inverting inputs connected to the nodes 53 and 51, respectively, and the comparators 62 and 66 have their non-inverting inputs connected to the same respective nodes. Positive and negative ring reference voltages, $V_{Rref}$ and $-V_{Rref}$, are connected to the inverting input and non-inverting input of the comparators 62 and 60, respectively. Similarly, positive and negative tip reference voltages, $V_{Tref}$ and $-V_{Tref}$, are connected to the inverting input and non-inverting input of comparators 66 and 64, respectively.

An over-voltage condition (+OVI=true) results whenever either of the voltages at nodes 51 or 53 exceeds the positive tip or ring reference voltages $V_{Tref}$ or $V_{Rref}$. The positive tip and ring reference voltages, $V_{Tref}$ and $V_{Rref}$, have been selected such that an over-voltage condition will occur when either the tip voltage exceeds a voltage threshold of 20 volts (+20Vdc) or the ring voltage exceeds a voltage threshold of 5 volts (+5Vdc). Similarly, an under-voltage condition (−OVI=true) occurs whenever either of the voltages at nodes 51 or 53 is less than the negative tip or ring reference voltages, $-V_{Tref}$ or $-V_{Rref}$. The negative tip and ring references voltages, $-V_{Tref}$ and $-V_{Rref}$, have been selected such that an under-voltage condition will occur when either tip voltage $V_{TIP}$ is less than a voltage threshold of minus 35 volts (−35Vdc), or the ring voltage $V_{RING}$ is less than a voltage threshold of minus 72 volts (−72Vdc). This last voltage threshold corresponds to the office battery voltage minus 20 volts. The positive and negative tip and ring reference voltages, $V_{Tref}$, $-V_{Tref}$, $V_{Rref}$, and $-V_{Rref}$ are +1.70Vdc, −2.98Vdc, +0.43Vdc, and −6.13Vdc, respectively. The microprocessor 74 sets an output 112 to either a logic true level, +5 volts, to open the relay 12, or to a logic false level, 0 volts to close the relay 12. This is done by the method of over-voltage protection control, which will be described later, according to the presence or absence of an over-voltage (+OVI=true) or an under-voltage (−OVI=true) condition.

The controller 16 further includes a comparator 72 which has an input connected to the line 23 from the current sensing circuit 14, and another input connected to a current reference voltage, $R_{Iref}$. The value of the current reference voltage $V_{Iref}$ is selected such that when the current in the subscriber line 10 exceeds 25 mA the voltage on the line 23 will exceed the current reference voltage $V_{Iref}$, thereby causing the output of the comparator 72 to transition to a logic true level of +5 volts. The output of the comparator 72 is connected to an input 108 of the microprocessor 74. A logic true level on the input 108 indicates an over-current condition (OCI). The microprocessor 74 following the method of over-current protection control, which will be described later, outputs current from the output 110 for operating the battery isolation circuit 20 appropriately, according to the presence of absence of an over-current condition indication (OCI=true).

An advantage of the battery isolation circuit 20, which uses the FET 34 to connect the battery 22 to the subscriber line 10, is that the FET will not wear out like the contacts of the relay 12. This allows the battery 22 to be disconnected and re-connected to the line 10 many more times over the lifetime of the line circuit if the relay 12 were used. The method of over-current protection control, which will be described next, makes use of this advantage to obtain further advantages over known techniques for over-current protection of line circuits.

Another advantage of the battery isolation circuit 20, which uses the FET 34 in saturation mode is that fewer components are required than if the FET 34 were used in its linear mode.

Figure 4:
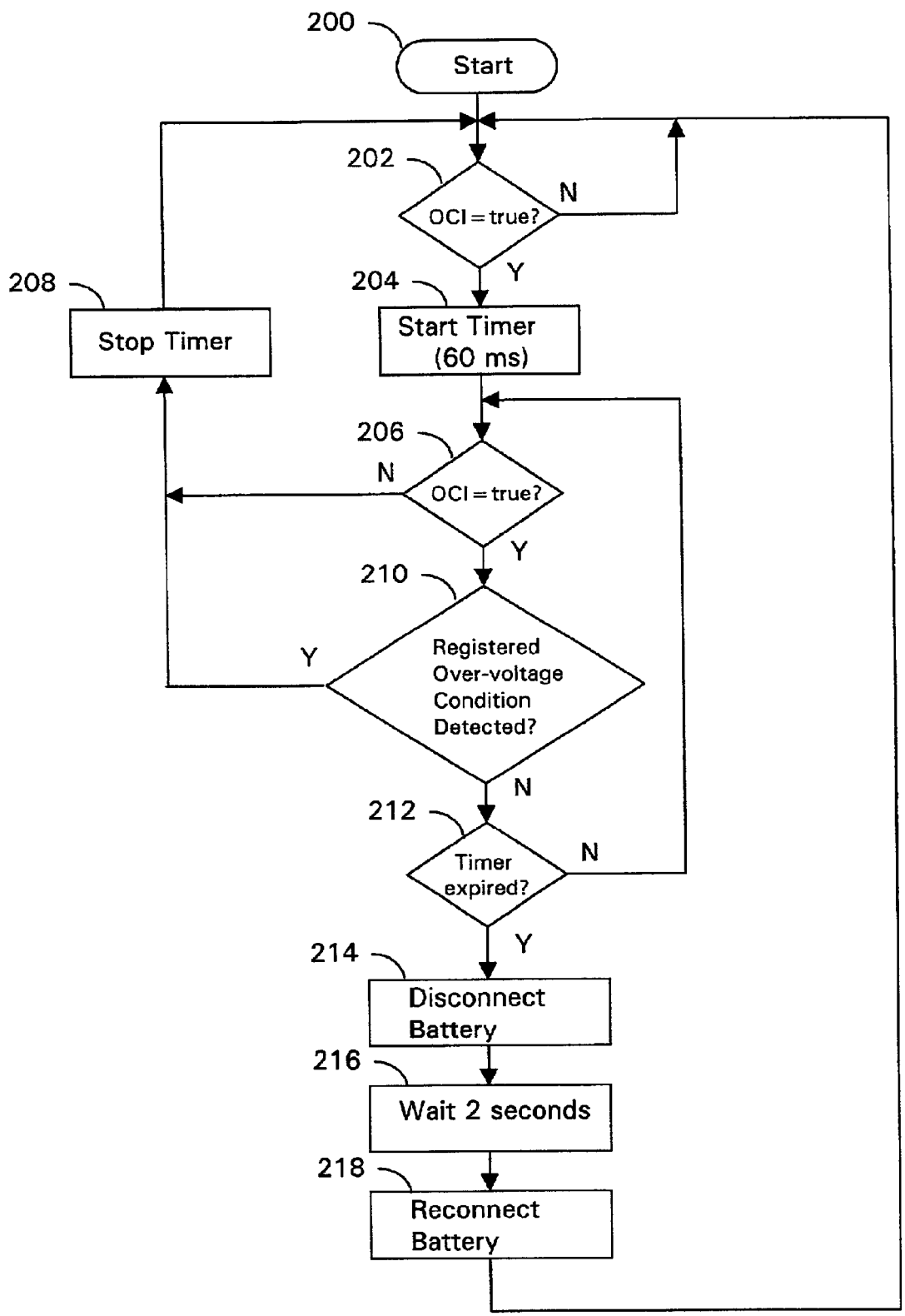
FIG. 4 is a flow chart illustrating the method of over-current protection control, in accordance with an embodiment of the present invention, as performed by the controller block of FIG. 1.

Referring to FIG. 4, the method of over-current protection control will now be described. The start of the method is represented by box 200. After the method has started, checking for a presence of the over-current condition, OCI= true, is performed, as shown in box 202. If an over-current condition is present, a 60 ms timer, implemented in software, is started, as shown in box 204. If an over-current condition is not present, checking for a presence of the over-current condition is performed again, as shown in box 202. After the timer has been started, checking for the presence of the over-current condition is performed, as shown in box 206. If the over-current condition is no longer present, the timer is stopped, as shown in box 208. Checking for another presence of the over-current condition is then performed, as shown in box 202, and the method continues from box 202 as previously described. However, if the over-current condition is still present, checking for a presence of a registered over-voltage condition is performed next, as shown in box 210. This is done by checking a register bit of the microprocessor 74 to determine if the register bit has been set. The register bit is set by the method of over-voltage protection control illustrated in FIG. 5, which will be described later. If a registered over-voltage condition is present, the timer is stopped, as shown in box 208. Checking for another presence of the over-current condition is then performed, as shown in box 202, and the method continues from box 202 as previously described. If a registered over-voltage condition is not present, the timer is checked to determine if it has expired, as shown in box 212. If the timer has not yet expired, checking for the presence of the over-current condition is performed, as shown in box 206. However, if the timer has expired, meaning that the over-current condition has existed for at least 60 ms, the battery 22 is disconnected from the line 10, as shown in box 214. This is done through the use of the battery isolation circuit 20 and the controller output 100, as described earlier. After waiting 2 seconds, as shown in box 216, the battery isolation circuit 20 is de-activated to reconnect the battery, as shown in box 218. After the battery 22 has been reconnected, checking for another presence of the over-current condition is then performed, as shown in box 202, and the method continues from box 202 as previously described.

Using the method of over-current protection, described above, for protecting the line circuit from short duration over-current conditions has the advantage of being responsive to the duration of the over-current condition. That is, since the line circuit is disconnected from the battery 22 for 2 seconds intervals at a time, the line circuit will be re-connected to the battery 22 within 2 seconds after the over-current condition has ended. This allows the line circuit to return to normal operation shortly after the over-current condition has ended, if a return to normal operation is possible.

Figure 5A:
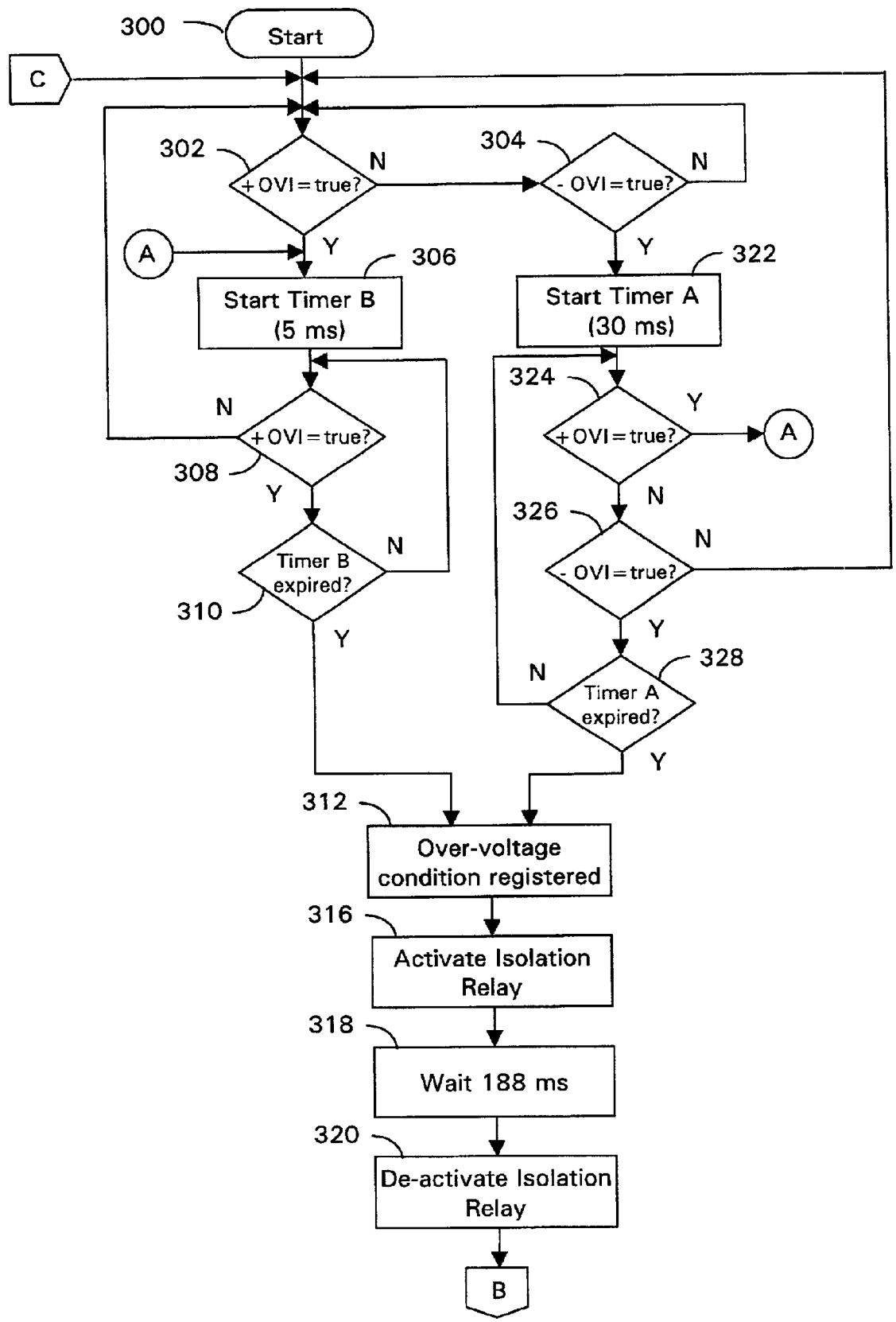
FIG. 5A and FIG. 5B are flow charts illustrating the method of over-voltage protection control, in accordance with an embodiment of the present invention, as performed by the controller block of FIG. 1.
Figure 5B:
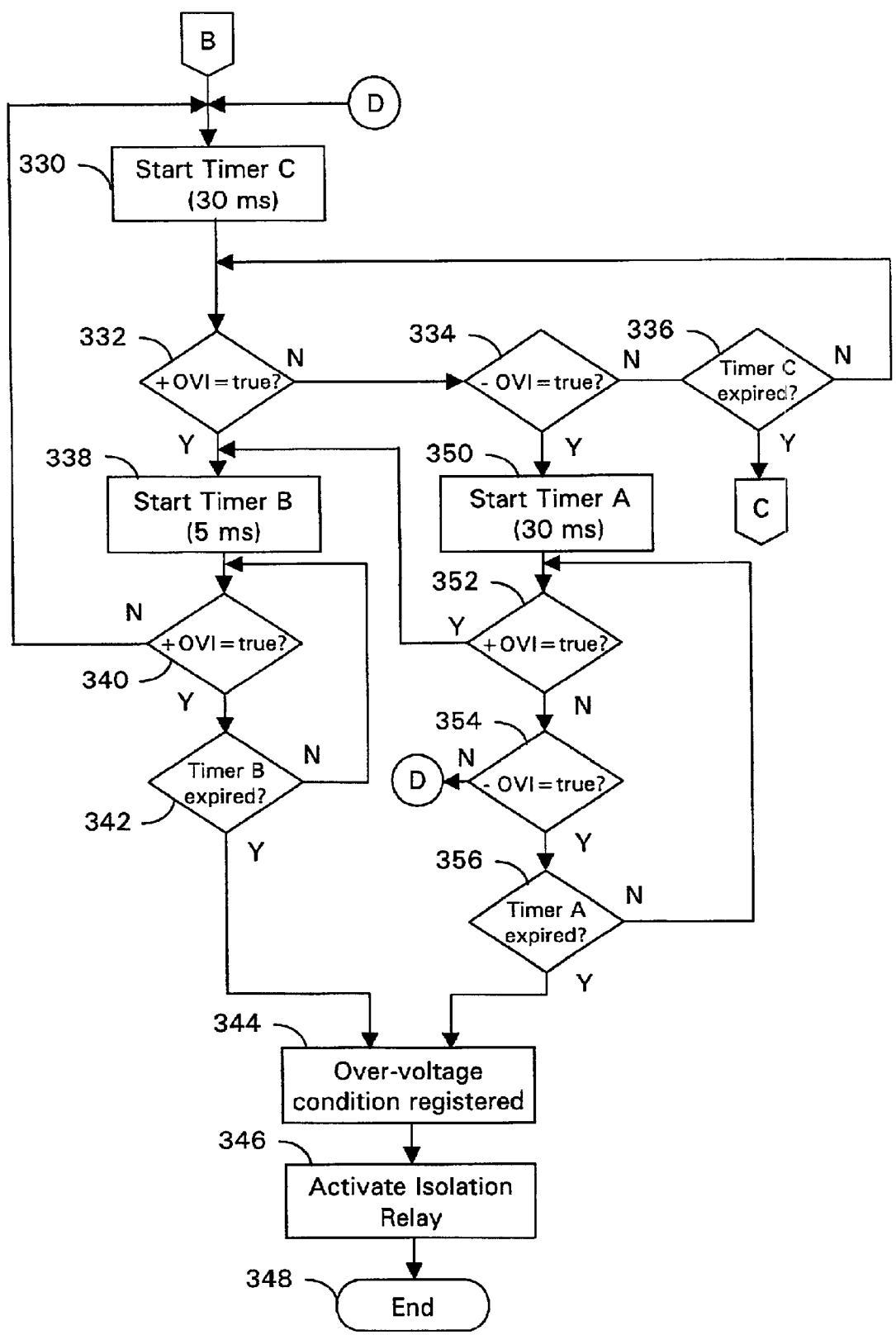

Referring to FIG. 5, the method of over-voltage protection will now be described. The start of the method is shown in box 300. After the method has started, checking for a presence of the positive over-voltage condition, +OVI=true, is performed, as shown in box 302. If a positive over-voltage condition is not present, checking for a presence of the negative over-voltage condition is performed, as shown in box 304. If a negative over-voltage condition is not present, then checking for a presence of the positive over-voltage condition is again performed, as shown in box 302, and the method continues from box 302 as previously described. If a positive over-voltage condition is present, a 5 ms timer, timer B, which is implemented in software, is started, as shown in box 306. Checking for the presence of the positive negative over-voltage condition is performed, as shown in box 308. If the positive over-voltage condition is no longer present, checking for another presence of the positive over-voltage condition is performed, as shown in box 302, and the method continues from box 302 as previously described. If the positive over-voltage condition is still present, then the timer B is checked to determine if it has expired, as shown in block 310. If the timer B has not yet expired, then checking for the presence of the positive over-voltage condition is again performed, as shown in box 308, and the method continues from box 308 as previously described. However, if the timer B has expired, then an over-voltage condition is registered, as shown in box 312, by setting an over-voltage flag (OVF) bit, in a register of the microprocessor 74 to a low state. The isolation relay 12 is activated, as shown in box 316, to disconnect the line circuit from the line 10. This activation is achieved by setting the voltage at the output 112 of the microprocessor 74 to a logic true state.

An advantage of disconnecting the line circuit from the line 10 after 5 milliseconds is that in the event that the fault condition is the result of a 50/60 Hz power line being shorted to the line 10 the relay 12 will open close to the zero crossing of the 50/60 Hz voltage on the power line, thereby minimizing the amount of arcing and resultant burn-out of the contacts of the relay 12.

After waiting 188 ms, as shown in box 318, the isolation relay 12 is deactivated, as shown in box 320, in order to reconnect the line circuit to the line 10. A 30 ms timer, timer C, which is implemented in software, is started, as shown in box 330. Checking for a presence of either the positive over-voltage condition or the negative over-voltage condition is performed, as shown in boxes 332 and 334, respectively. If there is not a presence of either the positive over-voltage condition or the negative over-voltage condition, then the timer C is checked to determine of it has expired, as shown in box 336. If the timer C has not yet expired, then checking for a presence of either the positive over-voltage condition or the negative over-voltage condition is repeated, as shown in boxes 332 and 334. However, if the timer C has expired, and neither a positive over-voltage condition nor a negative over-voltage condition is present, then the OVF bit is set high thereby clearing the registration of the registered over-voltage condition. Checking for another presence of the positive over-voltage condition is then performed, as shown in box 302, and the method continues from box 302 as previously described. In this way, the start of the method is returned to if there is an absence of a positive over-voltage condition and of a negative over-voltage condition for the duration of the timer C.

If a positive over-voltage condition is present after the timer C has been started, then the timer B is started, as shown in box 338. Checking for the presence of the positive over-voltage condition is performed, as shown in box 340. If the positive over-voltage condition is no longer present, then the timer C is started, as shown in box 330, and the method continues from box 330 as previously described. However, if the positive over-voltage condition is still present, then the timer B is checked to determine if it has expired, as shown in box 342. If the timer B has not yet expired, then checking for the presence of the positive over-voltage condition is again performed, as shown in box 340, and the method continues from box 340 as previously described. However, if the timer B has expired, then an over-voltage condition is registered, as shown in box 344, by setting the OVF bit low. The isolation relay 12 is then activated, as shown in box 346, to disconnect the line circuit from the line 10, and the method ends, as shown in box 348. After the method has ended, the line circuit remains disconnected from the line 10 until an event to reconnect it occurs, such as a resetting of the line circuit.

Returning to box 304, if a negative over-voltage condition is present, then a 30 ms timer, timer A, which is implemented in software, is started, as shown in box in 322. Checking for a presence of the positive over-voltage condition is then performed, as shown in box 324. If a positive over-voltage condition is present, then the timer B is started, as shown in box 306, and the method continues from box 306 as previously described. However, if a positive over-voltage condition is not present, then checking for the presence of the negative over-voltage condition is performed, as shown in box 326. If the negative over-voltage condition is no longer present, then checking for a presence of the positive over-voltage condition is again performed, as shown in box 302, and the method continues from box 302 as previously described. However, if the negative over-voltage condition is still present, then the timer A is checked to determine if it has expired, as shown in box 328. If the timer A has expired, then an over-voltage condition is registered, as shown in box 312, and the method continues from box 312 as previously described. Otherwise, if the timer A has not expired, checking for a presence of the positive over-voltage condition is again performed, as shown in box 324, and the method continues from box 324 as previously described.

Returning to box 334, if a negative over-voltage condition is present, then the timer A is started, as shown in box in 350. Checking for a presence of the positive over-voltage condition is then performed, as shown in box 352. If a positive over-voltage condition is present, then the timer B is started as shown in box 338, and the method continues from box 338 as previously described. However, if a positive over-voltage condition is not present, then checking for the presence of the negative over-voltage condition is performed, as shown in box 354. If the negative over-voltage condition is no longer present, then the timer C is started, as shown in box 330, and the method continues from box 330 as previously described. However, if the negative over-voltage condition is still present, then the timer A is checked to determine if it has expired, as shown in box 356. If the timer A has not yet expired, checking for a presence of the positive over-voltage condition is again performed, as shown in box 352, and the method continues from box 352 as previously described. Otherwise, if the timer A has expired, then an over-voltage condition is registered, as shown in box 344, and the method contains from box 344 as previously described. That is, the isolation relay 12 is activated to disconnect the line circuit from the line 10, and the method ends.

The above method uses a two level approach in implementing over-voltage protection for the line circuit. At the first level, after an over-voltage condition has been registered, the line circuit is disconnected from the line 10. After waiting a predetermined amount of time the line circuit is reconnected to the line 10. Following this, a period of time is allowed in which, if the over-voltage condition remains absent, the line circuit is returned to the first level of protection. Otherwise, the line circuit advances to a second level of protection, from which the line circuit will be disconnected from the line 10 if the over-voltage condition persists for more than a specified period of time. This specified period of time is different for positive and negative over-voltage conditions. If the line circuit is disconnected from the line 10 under the second level of protection, it will remain so until an event to reconnect it occurs, such as a resetting of the line circuit.

An advantage of this method of protecting a line circuit connected to a telephone subscriber line from an over-voltage condition is that it is responsive to over-voltage conditions of short duration. That is, over-voltage conditions of short duration are likely to only require the first level of protection to be invoked, thereby eliminating the need for the line circuit to be reset in order to reconnect it to the line 10.

Numerous modifications, variations and adaptations may be made to the particular embodiments of the inventions described above without departing from the scope of the invention, which is defined in the claims.

What is claimed is:

1. A protection arrangement for a line circuit, comprising:

current sensing means for sensing current flowing through the telephone subscriber line;

voltage sensing means for sensing voltage across the telephone subscriber line;

line circuit isolation means for selectively coupling the line circuit to the telephone subscriber line;

power supply isolation means for selectively coupling a power supply to the line circuit; and control means for operating the power supply isolation means to decouple the power supply from the line circuit in response to a current sensed by the current sensing means exceeding a current threshold and to a voltage sensed by the voltage sensing means failing to exceed a voltage threshold, and to recouple the power supply to the line circuit responsive to a predetermined time interval having passed.

2. A protection arrangement as claimed in claim 1, wherein the power supply isolation means comprises:

a FET having a source for connecting to the power supply, a drain for connecting to the line circuit, and a gate; and an interface circuit connected to the source and drain of the FET, having an input connected to the control means, and an output connected to the gate of the FET, the interface circuit for operating the FET in saturation mode to couple the power supply to the line circuit and for turning off the FET to decouple the power supply from line circuit.

3. A protection arrangement as claimed in claim 2, wherein the interface circuit comprises:

a voltage divider having first and second resistors, the first resistor connected to the source of the FET at one end and to the gate of the FET at the other end, and the second resistor connected to the gate of the FET at one end; and a pnp transistor having a base connected to ground, an emitter coupled to the controller means, and a collector connected to the other end of the second resistor.

4. A protection arrangement for a line circuit comprising:

current sensing means for sensing current flowing through the telephone subscriber line;

line circuit isolation means for selectively coupling the line circuit to the telephone subscriber line;

power supply isolation means for selectively coupling a power supply to the line circuit; and control means for operating the power supply isolation means to decouple the power supply from the line circuit in response to a current sensed by the current sensing means exceeding a current threshold, and to recouple the power supply to the line circuit responsive to a predetermined time interval having passed;

wherein the power supply isolation means comprises a FET having a source for connecting to the power supply, a drain for connecting to the line circuit, and a gate; and an interface circuit connected to the source and drain of the FET, having an input connected to the control means, and an output connected to the gate of the FET, the interface circuit for operating the FET in saturation mode to couple the power supply to the line circuit and for turning off the FET to decouple the power supply from line circuit; and wherein the interface circuit comprises a voltage divider having first and second resistors, the first resistor connected to the source of the FET at one end and to the gate of the FET at the other end, and the second resistor connected to the gate of the FET at one end; a pnp transistor having a base connected to ground, an emitter coupled to the controller means, and a collector connected to the other end of the second resistor, and a zener diode having an anode connected to the source of the FET and a cathode connected to the gate of the FET.

5. A protection arrangement as claimed in claim 4, wherein the interface circuit further comprises a capacitor connected to the emitter of the pnp transistor at one end and to the drain of the FET at the other end.

6. A protection arrangement as claimed in claim 5, wherein the interface circuit further comprises a resistor that couples the emitter of the pnp transistor to the controller means.

7. A method of protecting a lien circuit connected to a power supply and to a telephone subscriber line from an over-current condition, the over-current condition being defined as when current flowing through the telephone subscriber line exceeds a predetermined current threshold value, comprising the steps of:
   a) checking for a presence of the over-current condition;
   b) starting, responsive to the over-current condition being present, a timer of predetermined duration;
      b)(1) checking, responsive to starting the timer and to the over-current condition being present, for a presence of an over-voltage condition, the over-voltage condition being defined as when voltage on the telephone subscriber line exceeds a predetermined voltage threshold value;
      b)(2) stopping, responsive to the over-voltage condition being present, the timer and continuing the method from the step (a) of checking;
   c) disconnecting, responsive to the timer having expired, the line circuit from the power supply;
   d) waiting a predetermined amount of time; and
   e) reconnecting the line circuit to the power supply.

8. A method as claimed in claim 7, wherein the step (b) of starting further comprises the steps of:
   checking, after starting the timer, for the presence of the over-current condition; and
   stopping, responsive to the over-current condition no longer being present, the timer and continuing the method from the step (a) of checking.

9. A method as claimed in claim 7, wherein the step (b) of starting a timer further comprises the steps of:
   checking, responsive to the over-current condition being present and an over-voltage condition not being present, the timer to determine if the timer has expired; and
   continuing, responsive to the timer not having expired, the method from the step of checking, after starting the timer, for the presence of the over-current condition.

10. A method of protecting a line circuit connected to a telephone subscriber line and to a separate power supply from an over-voltage condition, the over-voltage condition being defined as when voltage on the telephone subscriber line exceeds a predetermined voltage threshold value, comprising the steps of:
    a) checking for a presence of the over-voltage condition;
    b) starting, responsive to the over-voltage condition being present, a first timer of predetermined duration;
    c) disconnecting, responsive to the timer having expired and to the over-voltage condition being present, the line circuit from the power supply and from the telephone subscriber line;
    d) waiting a predetermined amount of time;
    e) reconnecting the line circuit to the power supply and to the telephone subscriber line;
    f) checking for the presence of the over-voltage condition;
    g) restarting, responsive to the over-voltage condition being present, the first timer; and
    h) disconnecting, responsive to the first timer having expired after being restarted and to the over-voltage condition being present, the line circuit from the telephone subscriber line.

11. A method as claimed in claim 10, wherein the step (e) of reconnecting further comprises the steps of:
    starting a second timer of predetermined duration after the telephone subscriber interface circuit has been recommended to the telephone subscriber line; and
    continuing, responsive to the second timer having expired and the over-voltage condition not being present, the method from the step (a) of checking.

12. A method as claimed in claim 10, wherein the step (b) of starting further comprises the steps of:
    checking, after the first timer has been started, for the presence of the over-voltage condition; and
    continuing, responsive to the over-voltage condition not being present and the first timer not having expired, the method from the step (a) of checking.

13. A method as claimed in claim 11, wherein the step (g) of restarting further comprises the steps of:
    checking, after the first timer has been restarted, for the presence of the over-voltage condition; and
    continuing, responsive to the over-voltage condition not being present, the method from the step of staring a second timer.

14. A method of protecting a lien circuit connected to a telephone subscriber line and to a separate power supply from positive and negative over-voltage conditions, the positive over-voltage condition being defined as when voltage on the telephone subscriber line exceeds a predetermined positive voltage threshold value and the negative over-voltage condition being defined as when voltage on the telephone subscriber line exceeds a predetermined negative voltage threshold value, comprising the steps of:
    a) checking for a presence of the positive over-voltage condition;
    b) checking, responsive to the positive over-voltage condition not being present, for a presence of the negative over-voltage condition;
    c) starting, responsive to the negative over-voltage condition being present, a first timer of predetermined duration;

d) disconnecting, responsive to the timer having expired and to the negative over-voltage condition being present, the line circuit from the power supply and from the telephone subscriber line;

e) waiting a predetermined amount of time;

f) reconnecting the line circuit to the power supply and to the telephone subscriber line;

g) checking for a presence of the positive over-voltage condition;

h) checking, responsive to the positive over-voltage condition not being present, for a presence of the negative over-voltage condition;

i) restarting, responsive to the negative over-voltage condition being present, the first timer; and j) disconnecting, responsive to the first timer having expired after being restarted and to the negative over-voltage condition being present, the line circuit from the telephone subscriber line.

15. A method as claimed in claim 14, wherein the step (f) of reconnecting further comprises the steps of:

starting, after the telephone subscriber interface circuit has been reconnected to the telephone subscriber line, a third timer of predetermined duration;

checking for a presence of the positive over-voltage condition;

checking, responsive to the positive over-voltage condition not being present, for a presence of the negative over-voltage condition; and continuing, responsive to the third timer having expired and both positive and negative over-voltage conditions not being present, the method from the step (a) of checking.

16. A method as claimed in claim 14, wherein the step (c) of starting further comprises the steps of:

checking, after the first timer has been started, for a presence of the positive over-voltage condition;

starting, responsive to the positive over-voltage condition being present, a second timer of predetermined duration;

disconnecting, responsive to the second timer having expired and to the positive over-voltage condition being present, the line circuit from the telephone subscriber line;

waiting a predetermined amount of time; and reconnecting the line circuit to the telephone subscriber line.

17. A method as claimed in claim 15, wherein the step (i) of restarting further comprises the steps of:

checking, after the first timer has been restarted, for a presence of the positive over-voltage condition;

starting, responsive to the positive over-voltage condition being present, a second timer of predetermined duration; and disconnecting, responsive to the second timer having expired and to the positive over-voltage condition being present, the line circuit from the telephone subscriber line.

18. A method as claimed in claim 17, wherein the step of starting a second timer further comprises the steps of:

checking, after the second timer has been started, for the presence of the positive over-voltage condition; and continuing, responsive to the positive over-voltage condition not being present and the second timer not having expired, the method from the step of starting the third timer.

19. A method as claimed in claim 17, wherein the step of checking for a presence of the positive over-voltage condition after the first timer has been restarted further comprises the steps of:

checking, responsive to the positive over-voltage condition not being present, for the presence of the negative over-voltage condition; and continuing, responsive to the negative over-voltage condition not being present and the first timer not having expired after having being restarted, the method from the step of starting the third timer.

20. A method as claimed in claim 14, wherein the step (c) of starting further comprises the steps of:

checking, after the first timer has been started, for the presence of the negative over-voltage condition; and continuing, responsive to the negative over-voltage condition not being present and the first timer not having expired, the method from the step (a) of checking.

* * * * *